May 17, 1932.  J. LANGSTRETH  1,858,743
MONOCAR
Filed Dec. 13, 1929   5 Sheets-Sheet 1

INVENTOR,
BY James Langstreth,
Booth & Booth
ATTORNEYS.

May 17, 1932. J. LANGSTRETH 1,858,743
MONOCAR
Filed Dec. 13, 1929 5 Sheets-Sheet 2

INVENTOR,
BY James Langstreth
Booth v Booth
ATTORNEYS.

May 17, 1932.  J. LANGSTRETH  1,858,743

MONOCAR

Filed Dec. 13, 1929  5 Sheets-Sheet 3

INVENTOR
James Langstreth
BY Booth & Booth,
ATTORNEYS.

May 17, 1932. J. LANGSTRETH 1,858,743
MONOCAR
Filed Dec. 13, 1929 5 Sheets-Sheet 4

INVENTOR.
BY James Langstreth,
Booth & Booth,
ATTORNEYS.

May 17, 1932.  J. LANGSTRETH  1,858,743

MONOCAR

Filed Dec. 13, 1929  5 Sheets-Sheet 5

INVENTOR,
BY James Langstreth,
Booth & Booth,
ATTORNEYS.

Patented May 17, 1932

1,858,743

UNITED STATES PATENT OFFICE

JAMES LANGSTRETH, OF SAN FRANCISCO, CALIFORNIA

MONOCAR

Application filed December 13, 1929. Serial No. 413,763.

My invention relates to a motor vehicle normally supported by two wheels arranged in tandem to track in the same line.

The principal object of the invention is to provide a light-weight machine of low cost of construction and operation, which is capable of great stability at high speed, which can be handled easily in dense traffic, and which affords a maximum of safety and comfort to the occupants. The machine is adapted both for sporting or pleasure use and as a single seater for police purposes.

The above object is achieved by providing two main wheels, arranged in tandem, upon which the machine normally operates, and a pair of transversely spaced auxiliary wheels which can be lowered into contact with the ground to steady the machine when standing or running slowly, and raised out of ground contact when traveling at higher speeds; further, by providing a frame and body of unique construction which support, inclose, and protect the mechanism and the occupants; and finally by providing a novel arrangement of mechanism and seats and novel construction of many parts which enables them to cooperate to the desired end.

These and other objects and advantages of the invention will be described fully hereinafter, with the understanding that the form, construction and arrangement of the several parts may be varied, within the limits of the claims hereto appended, without departing from the spirit of the invention as set forth in said claims.

A preferred embodiment of the invention will now be described fully with reference to the accompanying drawings, wherein:—

As shown in the drawings, there are two main load carrying wheels, a front wheel 1, and a rear wheel 2. These are arranged in tandem in the longitudinal center of the machine, and are surrounded and enclosed by the body and frame. The front wheel swings about a substantially vertical, or as is preferable, a rearwardly inclined axis for the purpose of steering the vehicle, and the rear wheel 2 is connected with the driving motor or engine 3, as will be described in detail hereinafter.

Figure 9:
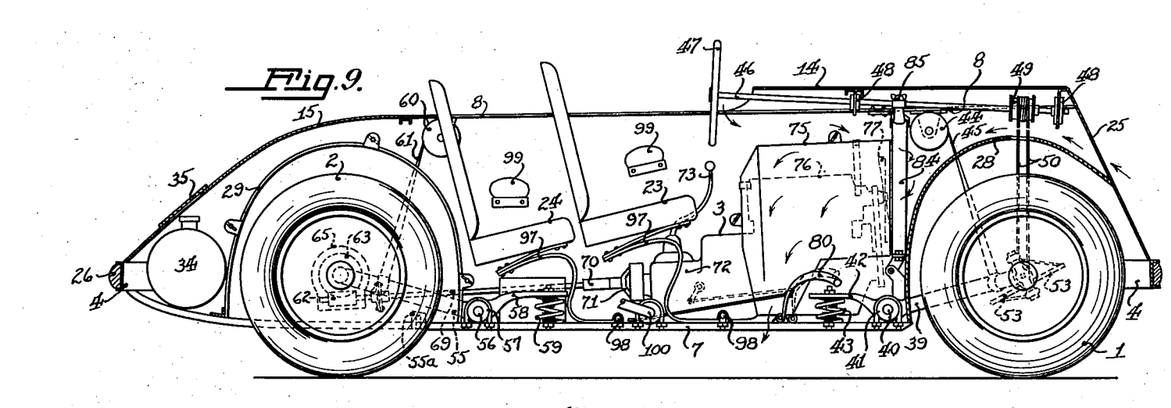
Fig. 9 is a longitudinal view showing the frame and body in section, and the running gear, driving mechanism and seats, in elevation.
Figure 10:
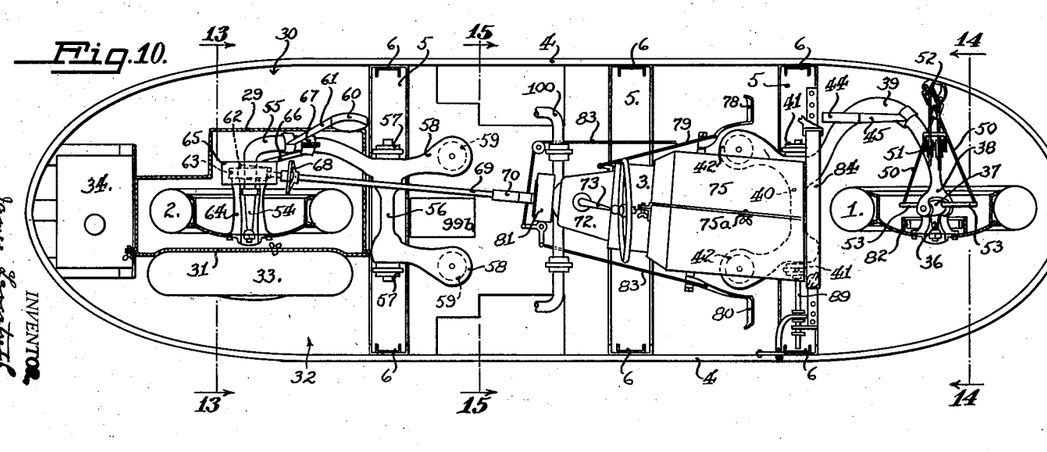
Fig. 10 is a sectional plan showing the frame, running gear, and driving mechanism.

The frame of the vehicle is a rigid structure supported by the wheels 1 and 2 by means of axles and springs to be described later. The frame itself, as illustrated particularly in Figs. 5 to 8, comprises an elongated horizontal oval member 4, formed preferably from a continuous piece of channel section steel, with approximately straight sides and rounded ends. To this member 4 are secured cross members 5 which are dropped below the level of said member 4, and inwardly sloping risers 6. The cross members 5 and risers 6 which constitute transverse ribs similar in general form to the ribs of the hull of a boat, may or may not be formed in one piece, as desired. There are three cross members 5, positioned as shown in Fig. 10, one immediately behind the front wheel 1, a second about the center of the machine, and the third just forward of the rear wheel 2. The cross members 5 support a plurality of longitudinal members 7, Figs. 5 to 8, which extend from the forward cross member to the rear of the frame. The center longitudinal member 7 is interrupted to the rear of the rear cross member to leave room for the rear wheel 2. The cross members 5 and the longitudinal members 7, which are at a lower level than the main frame member 4, support the motor 3 and the seats, as shown in Figs. 9 and 10.

Figure 1:
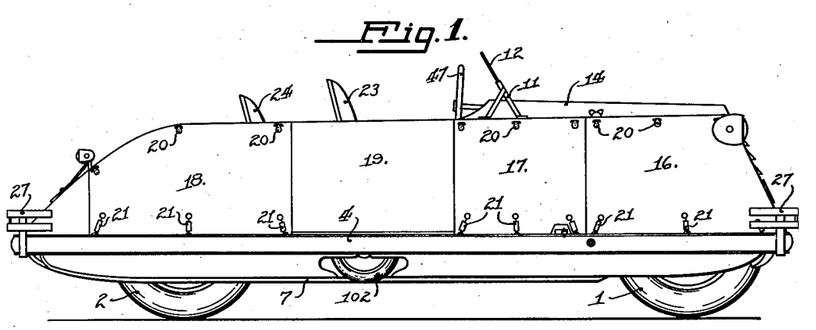
Fig. 1 is a side elevation of the complete machine.
Figure 5:
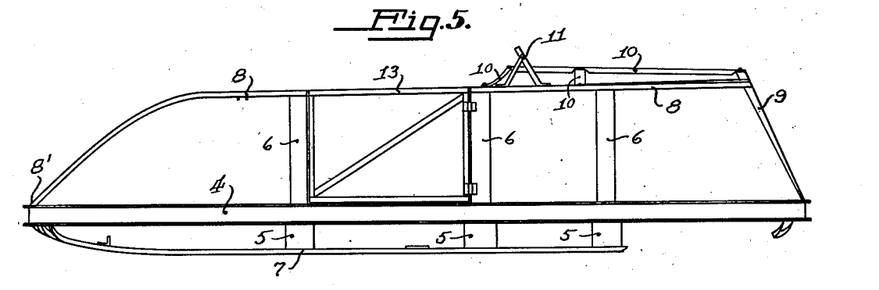
Figs. 5, 6, 7 and 8 are respectively a side elevation, a plan, a rear elevation, and a front elevation of the frame only of the machine.
Figure 6:
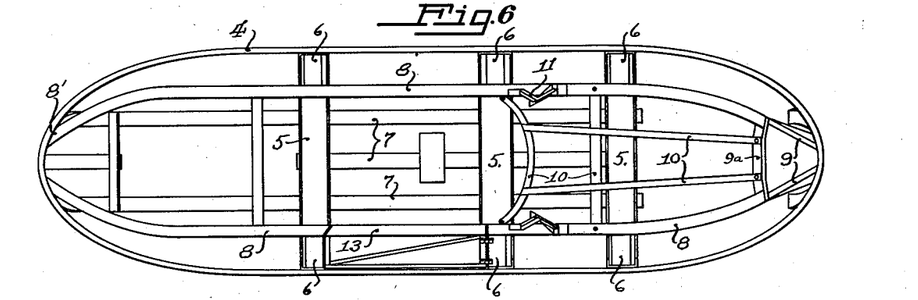
Figure 7:
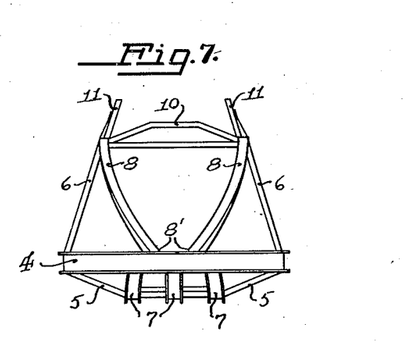
Figure 8:
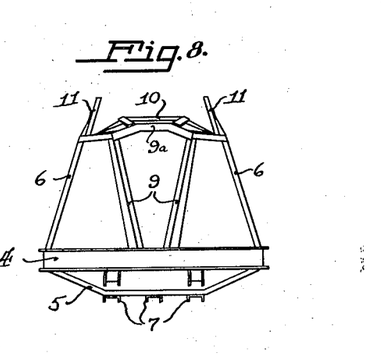

The risers 6, of which there are three on each side, support a pair of upper longitudinal frame members 8 extending the entire length of the machine and having their rear ends bent downwardly and inwardly to joint the main frame 4, as shown at 8' in Figs. 5 and 6. The forward ends of the upper members 8 are connected with the front of the main frame 4 by sloping risers 9 and a cross member 9a. A light frame-work 10 is carried by the forward portion of the upper members 8 and serves to support the steering gear and the forward deck or hood of the body in a manner to be described later. Brackets 11 are secured to the upper frame members 8 for the purpose of supporting a windshield 12, Figs. 1 and 11. The left hand upper frame member 8 is preferably continuous, but the right hand member 8 is interrupted between the center and rear risers 6 to permit the mounting of a door whose frame is shown at 13 in Figs. 5 and 6. The top of the door frame 13 forms a continuation of the frame member 8.

Figure 4:
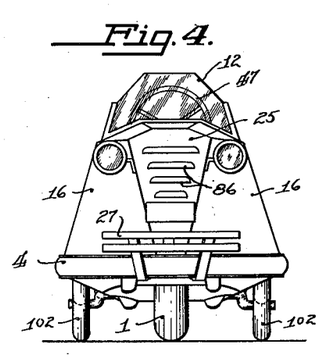
Fig. 4 is a front elevation showing the auxiliary wheels in ground contact position.

The body of the vehicle is preferably formed by plates or panels of sheet metal or other suitable material secured to the frame above the main member 4. A forward deck 14, Figs. 1 and 2, covers the front wheel 1 and the motor 3. A rear deck 15 covers the rear wheel 2, and has a door 15a, hinged at 15b, to give access to the rear body compartment. The sides of the body are formed by removable plates 16, 17, and 18, and on one side the door 19. The plates 16, 17 and 18 are preferably secured to the upper frame member 8 by hooks indicated at 20 in Figs. 1 and 11, and to the main frame 4 by suitable spring catches or hooks indicated at 21, similar to those ordinarily employed for holding the hood of an automobile. The center of the body forms an open cockpit 22, Fig. 2, in which are positioned the seats 23 and 24. An approximately triangular plate 25, Fig. 4, which may be an extension of the forward deck 14, covers the front of the body.

Figure 17:
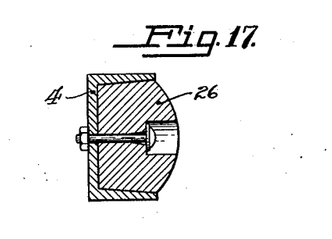
Fig. 17 is a sectional detail, enlarged, of one of the wood filled frame channels.

It will be observed that the oval main frame 4 projects outwardly beyond any other portions of the vehicle, and therefore acts as a guard or fender in the event of collision either from the end or side. On account of the strength and rigidity of this main frame, it affords the maximum protection to the machine and its occupants from injury resulting from collision. In order to increase the effectiveness of the main frame 4 as a fender, I prefer to construct it of channel steel with its channel turned outwardly, and to fill said channel with ply wood or other suitable material having a slightly rounded outer surface, as shown at 26 in Fig. 17. The longitudinal bottom frame members 7 are also preferably filled with ply wood in a similar manner. Suitable spring bumpers 27, Figs. 1 to 4, may be secured to the ends of the frame 4.

Figure 13:
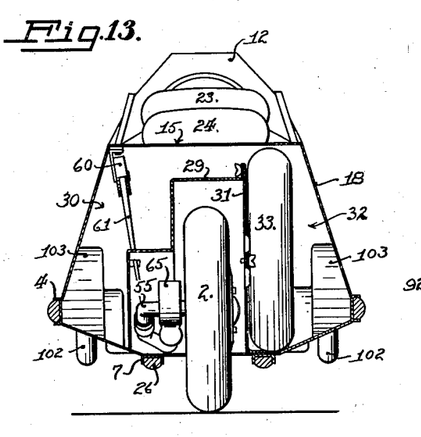
Figs. 13, 14, and 15 are partly diagrammatic sections taken on the respective lines 13—13, 14—14, and 15—15 of Fig. 10.

The front wheel 1 is provided with a suitably formed mud or splash guard 28, Fig. 9 inside the front compartment of the body and extending between the side plates 16 thereof. The rear wheel 2 is also inclosed by a splash guard 29, Figs. 9, 10 and 13, which forms a box or casing surrounding said wheel. To the left of this splash guard casing 29 is a space 30 between it and the outer wall of the body, which may be used as a luggage carrier. The right side of the splash guard 29 is formed as a removable plate 31, and between it and the outer wall 18 of the body is a space 32 in which a spare wheel 33 is carried. At the extreme rear of the body is a fuel tank 34, to which access is had through a suitable hand-hole 35 in the rear deck. The front wheel 1 is accessible by removing the forward body plate 16. The rear wheel 2 is reached by removing the rear body plate 18, the spare wheel 33 and the side cover 31 of the rear splash guard. The forward deck 14 with its frame 10 is preferably bolted to the frame members 8, and can be removed to permit the motor 3 to be taken out bodily for repairs or overhauling. Removal of the body plate 17 gives access to the motor 3 for minor adjustments.

The front wheel bearings, not shown, are carried upon a spindle 36, Fig. 10, extending laterally from a steering knuckle 37, which is mounted upon a spindle or king pin carried in the forked end 38 of a curved member 39, the latter having the function of an axle. The king pin is inclined rearwardly at its upper end at a preferable incline of about 27 degrees from the vertical. I prefer to use a disk wheel of common type, which permits the steering spindle to be placed in the vertical plane of the center of the wheel. The axle 39 is curved rearwardly, as shown in Fig. 10, and is secured to or formed integrally with a transverse member 40 mounted for rocking motion in bearings 41 secured to the forward frame cross member 5. Arms 42 extend rearwardly from the member 40, and have suitable springs 43, Fig. 9, positioned between them and the frame members 7. These are the load supporting springs of the vehicle, for it will be observed that as weight is applied to the frame, or as the front wheel 1 rises to pass an obstruction in the road, the axle 39 rocks about the transverse axis of the member 40, compressing the springs 43. A shock absorber or rebound check 44, Fig. 9, of any well known type is secured to one of the upper frame members 8, and is connected with the axle 39 by a strap 45.

Figure 16:
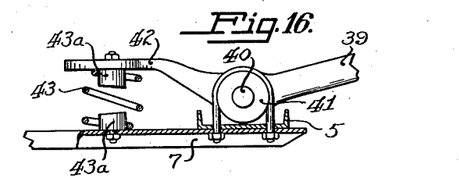
Fig. 16 is an enlarged detail of one of the main supporting springs.

The springs 43 may be of any suitable type, and as an example, I have shown them as helical. Fig. 16 is a detail of one of these springs. A pair of resilient bumpers, preferably cylindrical rubber blocks 43a are positioned within the ends of the spring 43, one block being secured to the arm 42 and the other to the frame member 7. Said blocks therefore serve as guides to hold the ends of the spring in position, as well as limiting the extent of its compression.

Figure 14:
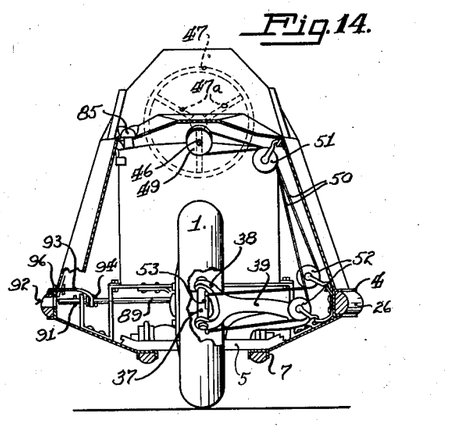

The frame 10 also supports the steering gear which comprises a longitudinal, nearly horizontal, and somewhat resilient shaft 46, upon the rear end of which is the steering wheel 47, having spokes 47a, Fig. 14, preferably formed of flat spring steel. The shaft 46 is mounted in suitable bearings, which are carried in resilient rubber blocks 48, Fig. 9, secured to the frames 10 and 9a, and carries a drum 49 about which is wound a cable 50. The two ends of the cable 50 extend downwardly and toward the left side over guide pulleys 51, Figs. 10 and 14, and thence over guide pulleys 52 to oppositely disposed arms 53 extending from the steering knuckle 37. The cable 50 is so arranged that the movement of the front axle 39 relative to the frame has no appreciable effect on the steering mechanism, and the resilience of the steering wheel 47 and its shaft 46, with its resilient mounting in the rubber blocks 48, minimizes the transmission of road shocks to the hands of the operator.

The rear wheel 2, which has no steering action, is mounted upon a spindle 54, Figs. 9 and 10, formed upon the end of a bent axle member 55 which extends forwardly and is secured to or formed integrally with a transverse member 56. The latter is mounted for rocking motion in bearings 57 secured to the rear cross frame member 5, and has forwardly extending arms 58 operating against springs 59, similar to those described above in connection with the front axle. A rebound check 60 is secured to the left frame member 8, and is connected with the rear axle 55 by a strap 61. A rubber bumper 55a, Fig. 9, is secured to one of the longitudinal frame members 7 in position to be engaged by the axle 55 to limit its downward movement.

The rear wheel 2 is driven by a worm 62 and worm wheel 63, Figs. 9 and 10, the latter being mounted upon or connected with the hub 64 of the wheel. The worm is suitably journaled in a housing 65, which is secured to the axle 55 in any convenient manner. In order to resist the driving torque of the worm, I prefer to employ a brace 66 extending forwardly from the housing 65 and secured to the axle 55 by a collar 67. The worm 62 is connected by a universal joint indicated at 68 with a drive shaft 69. The latter has the usual slip joint indicated at 70, and is connected by a second universal joint indicated at 71 with the shaft, not shown, extending from the rear of the transmission or change speed gear housing 72.

I prefer to employ a conventional form of automobile power plant in which a gasoline engine, a suitable clutch, and a transmission or change speed gear, are mounted in a unit construction, and the details of this power plant, therefore, form no part of the present invention. The motor 3 with its associated mechanism, which forms the complete unitary power plant, is mounted in any suitable manner, not shown in the drawings, upon the lower members of the frame, and is positioned immediately to the rear of the front wheel 1, and in front of the driver occupying the forward seat 23. The usual gear shifting lever 73 extends upwardly immediately in front of the seat 23 between the driver's knees. The forward edge of the seat is cut away, as shown at 74 in Fig. 2 to accommodate said gear lever. The driver's feet straddle the rear portion of the motor 3, and in order to protect him from the heat of said motor, there is provided a suitably insulated housing 75, Figs. 9 and 10, surrounding the cylinder block 76 and radiator fan 77 of said motor. The housing 75 is preferably made in two separable portions as indicated at 75a in Fig. 10, in order to permit access to the upper portion of the motor after the body side plate 17 is removed. A conventional clutch pedal 78 is indicated upon the left hand side of the motor and is understood to be connected with the usual clutch, (not shown) by a rod 79. A brake pedal 80 is mounted at the right of the motor, and may be used to operate suitable brakes in any well known manner. For example, I have indicated a brake at 81 surrounding the forward universal joint 71 and thus acting upon the rear wheel through the drive shaft 69, and a second brake 82 mounted upon the front wheel 1. These brakes are both connected with the pedal 80 by any suitable means indicated at 83 in Fig. 10 as a system of rods, levers and cables.

If the motor 3 is water cooled, the radiator 84 is preferably mounted transversely of the machine to the rear of the front wheel splash guard 28 and in front of the motor 3, as shown in Figs. 9 and 10. The filling spout 85 of said radiator extends up through the upper deck 14. Air entering the forward body compartment through louvers 86, Fig. 4, in the front panel of the body, and also through the open cockpit 22 is drawn rearwardly through the radiator by the fan 77 and expelled downwardly between the motor 3 and its inclosed housing 75, said housing extending to the rear face of the radiator, as shown in Figs. 9 and 10.

In order to crank the motor by hand, if such should be necessary, I provide a laterally extending shaft upon which a removable crank may be fitted through an opening in the side of the machine. The arrangement of this shaft is best shown in Fig. 12, where the forward end of the motor crank shaft is indicated at 87, and is provided with a bevel gear 88. A transverse shaft 89 carries at its inner end a bevel gear 90 which may be moved into and out of mesh with the crank shaft gear 88 by sliding the shaft 89 axially in its bearings, that is, transversely of the machine. The outer end of the shaft 89 is provided with suitable means, indicated as a pin 91, to receive a removable crank, not shown, which is inserted through a hole 92 in the frame 4. Any suitable means may be provided for sliding the shaft 89 axially, and as an example thereof I have shown a curved bracket 93 having its inner end loosely surrounding the shaft 89 between a pair of collars 94 thereon. The outer end of the bracket 93 projects through a slotted guide 95, Figs. 11 and 12, in the side of the body and is provided with a pair of pins 96, one lying on each side of said guide. By sliding the outer end of the bracket 93 rearwardly from the position shown in full lines in Fig. 12 to that shown in dotted lines, the inner end of said bracket will be brought outwardly to separate the gears 88 and 90. Thus the shaft 89 may remain stationary except when it is desired to use the hand crank.

Figure 2:
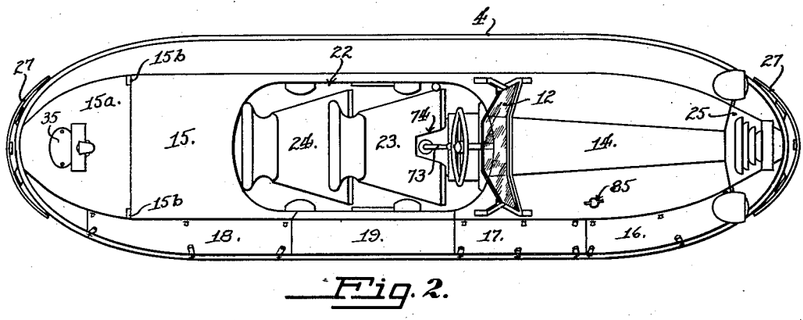
Fig. 2 is a plan thereof.
Figure 3:
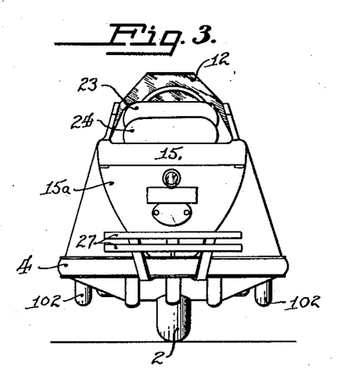
Fig. 3 is a rear elevation showing the auxiliary steadying wheels in elevated or inoperative position.
Figure 15:
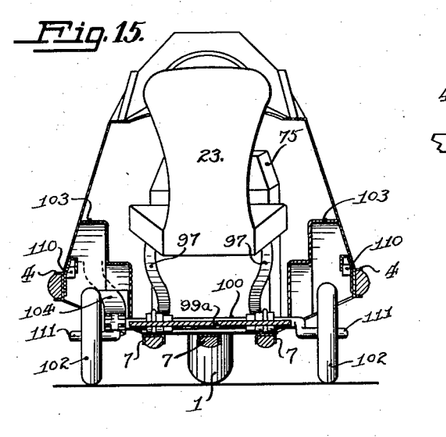

The seats 23 and 24 are of the coach type as used in automobile body practice, but are modified by being narrowed at their backs, as shown in Figs. 2 and 12, so that the occupant of the rear seat may straddle the front seat. The seats are mounted upon spring supports 97 having the shape shown clearly in Fig. 9, which allows them to have considerable resilient movement independent of the body. The lower ends of the spring supports 97 are secured by hinges 98 to the lower frame members 7, so that the seats may be tilted forwardly. This permits access to the rear seat, and to the space behind it. Suitable arm rests 99 are preferably secured to the sides of the body. A floor 99a, shown only in Fig. 15, is positioned above the lower frame members 7, and is suitably cut away to fit around the transmission case 72, the springs 43 and 59, and such other parts as may pass through it. A convenient location for the storage battery is indicated at 99b, Figs. 9 and 10, beneath the rear seat 24.

Figure 11:
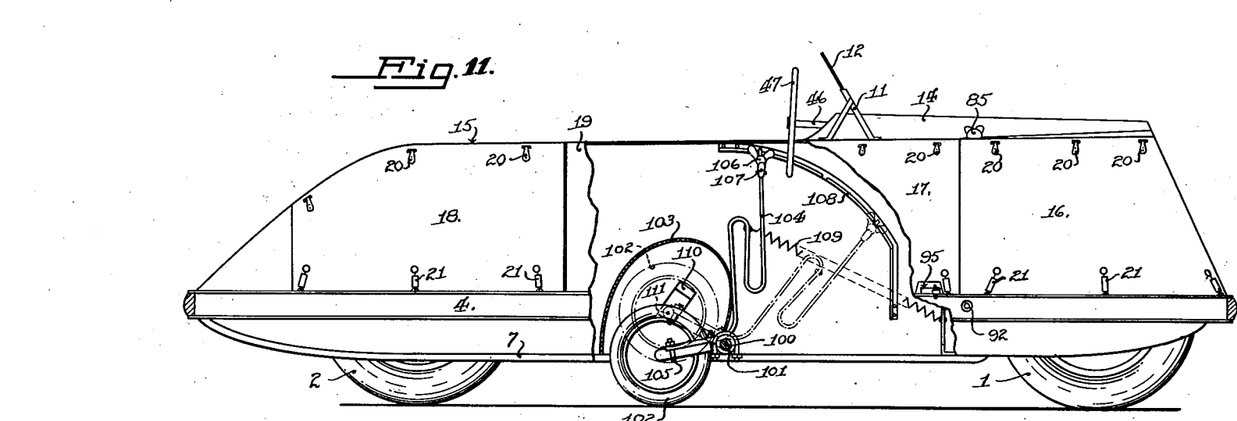
Fig. 11 is a partly broken side elevation showing the mechanism for elevating and depressing the auxiliary wheels.
Figure 12:
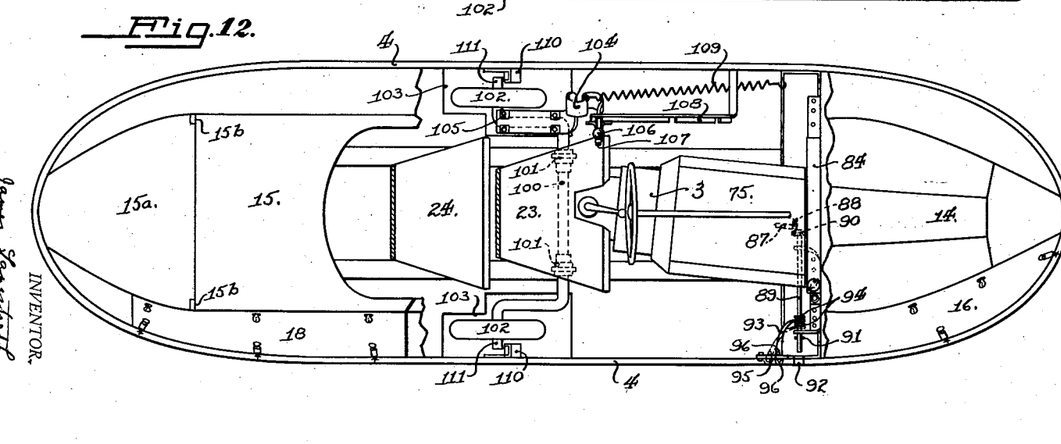
Fig. 12 is a partly broken plan view showing the relative positions of the auxiliary wheels, the seats and the motor.

In order to steady the machine when standing or travelling at low speed, a pair of laterally spaced auxiliary wheels 102 are provided, as illustrated in Figs. 11, 12, and 15. An axle 100 is mounted for rocking motion in suitable bearings 101 upon the lower frame members 7, and has its ends offset rearwardly. The auxiliary wheels 102 are rotatably mounted upon said offset ends so that as the axle 100 is rocked in its bearings 101 said wheels are lowered or raised into and out of contact with the ground. Splash guards 103 cover the auxiliary wheels 102.

In order to raise or lower the auxiliary wheels 102, there is provided a lever 104 preferably formed of a piece of spring steel bent into compressed S-shape, Figs. 11 and 12. The lower end of said spring lever is secured to the axle 100 in any convenient manner, as for example by U-bolts 105, and its upper end is provided with a handle 106 and a suitable thumb latch 107 operating over a notched quadrant 108 secured to the left side of the frame within convenient reach of the driver. A tension spring 109 counterbalances the weight of the auxiliary wheels 102 so that little effort is required to move the lever 104. Resilient stops, preferably rubber blocks 110, are secured to the side frame members 4 in position to be engaged by the projecting ends 111 of the axle 100 when the auxiliary wheels are in their extreme uppermost position. The lever 104 is formed and positioned to raise the auxiliary wheels to the position shown in broken lines in Fig. 11, in which the ends 111 of the axle 100 are somewhat below the stops 110. Thus the auxiliary wheels have a spring action even when elevated, so that when one of them strikes the ground as a result of the tilting of the vehicle, the spring lever 104 will yield to allow the wheel still further elevating movement before it is stopped by the resilient block 110. When the wheels are in their lower position, as indicated in full lines, the vehicle is held upright and the spring lever 104 provides ample resilience to accommodate inequalities in the ground surface. The quadrant 108 is provided with a notch at each end with which the latch 107 cooperates to lock the auxiliary wheels in either raised or lowered position. One or more intermediate notches may be provided to hold the auxiliary wheels in intermediate positions.

It will be seen from the foregoing description that my machine has all the economy, flexibility, ease of handling, and stability at high speed of the motorcycle, combined with a degree of comfort comparable to that of a four wheeled automobile, and considerably greater safety than afforded by any vehicle of similar size and weight. Because of running normally on two wheels tracking in a single line, and also because of the low center of gravity, there is no side sway or wabble, even at high speeds or in rounding curves. The inclination of the steering knuckle and king pin conforms to approved motor-cycle practice, and enables the machine to be steered with ease at high speeds, the operator shifting his weight to one side or the other to bank on turns. The flexibility of the steering wheel and its shaft absorbs road shocks before reaching the operator's hands.

Comfort is provided by the inclosed body and the position and resilient mounting of the seats. The substantially oval main frame member, which surrounds the entire vehicle and serves as a guard or fender in the event of collision, affords maximum safety.

Operation of the machine at low speeds and in heavy traffic is rendered simple by the auxiliary steadying wheels. These may be set at their lowermost position, to enable operation on all four wheels, or at an intermediate position, in which they may be brought into play instantly, when necessary, by tilting the vehicle slightly to one side or the other.

Finally, the compactness and light weight, and the stream line design of the body, make for the greatest possible economy and ease of operation.

I claim:—

1. In a motor vehicle, an elongated horizontal frame member, a pair of wheels arranged in tandem and positioned within the respective end portions of said frame member, means for resiliently mounting said frame upon said wheels, risers extending upwardly from said frame member, body panels removably positioned upon said risers, said panels forming an inclosed body supported upon and positioned above said horizontal frame member, an engine carried by said frame to the rear of the forward wheel, driving connections between said engine and the rear wheel, and a housing inclosing the upper portion of said engine and spaced from said body panels.

2. In a motor vehicle, an elongated horizontal frame member, a pair of wheels arranged in tandem and positioned within the respective end portions of said frame member, means for resiliently mounting said frame upon said wheels, an inclosed body mounted upon said frame, an engine carried by said frame to the rear of the forward wheel, a driving connection between said engine and the rear wheel, a radiator mounted upon said frame between said engine and the forward wheel, and a housing extending rearwardly from said radiator and inclosing the upper portion of said engine, said housing having an open bottom and being spaced from the sides of said body.

3. In a motor vehicle, an elongated horizontal frame member, a pair of wheels arranged in tandem and positioned within the respective end portions of said frame, a body mounted upon said frame and provided with inclosed end portions covering said wheels and an open central portion, a seat positioned within said open portion, an engine carried by said frame to the rear of the forward wheel, said engine and said forward wheel being housed within the forward inclosed portion of said body, and an inclosed splash guard surrounding the rear wheel and spaced within the rear body portion.

4. In a motor vehicle, an elongated horizontal frame member, a pair of wheels arranged in tandem and positioned within the respective end portions of said frame, means for resiliently mounting said frame upon said wheels, a body carried by said frame, said body having an inclosed forward portion surrounding the forward wheel, an open central portion provided with a seat, and an inclosed rear portion surrounding the rear wheel, a splash guard inclosing the rear wheel and spaced from the rear body portion, said splash guard having a removable side, a driving motor positioned within said body between said wheels and operatively connected with one of said wheels, and removable panels in the side of said body adapted to provide access to said motor and said wheels.

5. In a motor vehicle, a pair of wheels arranged in tandem, a steering knuckle upon which the forward wheel is mounted for swinging movement to steer the vehicle, a frame surrounding said wheels and resiliently carried thereby, a superstructure carried by and extending upwardly from said frame over the forward wheel, a substantially horizontal longitudinally disposed steering shaft journaled in said superstructure, a drum mounted upon said shaft, a cable having a bight surrounding said drum, the ends of said cable being connected with said knuckle for steering the forward wheel, and a driving motor carried by said frame and operatively connected with the rear wheel.

6. In a motor vehicle, a pair of wheels arranged in tandem, a frame surrounding said wheels and resiliently mounted thereupon, a splash guard surrounding the rear wheel and provided with a removable side, a body mounted upon said frame and having an inclosed rear portion surrounded and spaced from said splash guard, a removable panel forming one side of said rear body portion, a spare wheel carried between said removable panel and the removable side of said splash guard, and a driving motor carried by said frame and operatively connected with said rear wheel.

7. In a vehicle, an elongated substantially continuous horizontal frame surrounding the entire vehicle and having longitudinal side members and transverse connecting members, a pair of substantially U-shaped axles each having one leg pivotally connected with a transverse member of said frame, a supporting wheel mounted upon the other leg of each axle, said wheels being positioned in tandem within the end portions of said frame, resilient weight supporting connections between said frame and said axles, and a body mounted upon said frame and inclosing said wheels.

8. A vehicle comprising an elongated horizontal main frame forming a fender surrounding the vehicle in the region of its greatest horizontal dimensions; a plurality of longitudinal frame members connected with and positioned within and below said main frame and provided with longitudinal channels in their lower surfaces; filler strips seated in said channels and having their outer surfaces projecting below the lower surfaces of said channeled members; a pair of supporting wheels arranged in tandem within the end portions of said main frame; and a body mounted upon and rising from said main frame.

9. A vehicle comprising an elongated horizontal main frame forming a fender surrounding the vehicle in the region of its greatest horizontal dimensions and projecting beyond the sides and ends thereof; cross frame members extending between the sides of said main frame; longitudinal members carried by said cross members below said main frame, said longitudinal and cross members being adapted to support the interior parts of the vehicle; inwardly sloping risers extending upwardly from said main frame; upper longitudinal members carried by said risers; body panels carried by said main frame, said risers, and said upper longitudinal members, said body panels sloping inwardly from said main frame; and a pair of supporting wheels arranged in tandem within the end portions of said main frame.

10. A vehicle comprising a hollow exterior main frame extending continuously around the entire vehicle and constituting its greatest horizontal dimensions, said frame being of channel section with its channeled side outermost; a filler strip seated within the channel of said frame and having a smooth outer surface projecting beyond the outer edges of said frame, said frame forming both a main supporting element for the other parts of the vehicle and a rigid surrounding fender therefor; road-running wheels mounted within and supporting said frame; and a body carried by said frame, all portions of said body being within the lateral dimensions of said frame.

In testimony whereof, I have signed my name to this specification.

JAMES LANGSTRETH.